United States Patent [19]

Nozick

[11] Patent Number: 4,748,541
[45] Date of Patent: May 31, 1988

[54] MODULAR CONTACT SYSTEM FOR TELEPHONE CABLE HEAD

[76] Inventor: Jacques E. Nozick, 28 rue Broca, 75005 Paris, France

[21] Appl. No.: 909,044

[22] Filed: Sep. 18, 1986

[30] Foreign Application Priority Data

Sep. 24, 1985 [FR] France .................... 85 14110

[51] Int. Cl.⁴ .............................. H01R 9/00
[52] U.S. Cl. .................. 361/426; 361/119; 379/332
[58] Field of Search ............... 339/14 R, 14 L, 17 R, 339/17 LC, 198 G, 198 GA, 198 R; 337/219, 291; 361/42, 56, 57, 111, 119; 331/332, 374, 397, 426; 379/19, 331, 332, 412

[56] References Cited

U.S. PATENT DOCUMENTS

| | | | |
|---|---|---|---|
| 3,255,330 | 6/1966 | MacKenzie et al. | 361/331 |
| 3,260,986 | 7/1966 | Staffel | 339/14 R |
| 3,936,133 | 2/1976 | Splitt et al. | 361/426 |
| 4,087,655 | 5/1978 | Massey | 379/19 |
| 4,313,147 | 1/1982 | Uchida et al. | 361/119 |
| 4,317,154 | 2/1982 | Passarella | 361/119 |
| 4,331,839 | 5/1982 | Baumbach | 361/426 |

FOREIGN PATENT DOCUMENTS 2753171  7/1978  Fed. Rep. of Germany ...... 361/119
2083294  3/1982  United Kingdom ............. 339/14 L

OTHER PUBLICATIONS

Dillon et al., "Transient Protection for Controlled Access System", IBM Technical Disclosure Bulletin, vol. 21, No. 3, 8/79, pp. 904–905.

Primary Examiner—A. D. Pellinen
Assistant Examiner—Gregory D. Thompson
Attorney, Agent, or Firm—Sughrue, Mion, Zinn, Macpeak and Seas

[57] ABSTRACT

A modular contact arrangement for connecting various protective and/or monitoring devices to phase lines 6, 7 of a cable head in a telephone distributor frame includes a plurality of spaced, springy contact blade pairs 5a, 5b, themselves arranged in associated pairs 51–52, 53–54, with a common ground bar 60 having individual springy fingers or blades 61, 62 interleaved between each associated pair in a comb-like manner. A circuit card 4 having three parallel conductive strips 41, 42, 43 printed on at least one face is configured to be insertable between two associated pairs of contact blades in a tongue-like manner such that electrical connections are established with such blades and with an interposed ground blade. Various circuit devices may be mounted on or connected to the card.

6 Claims, 2 Drawing Sheets

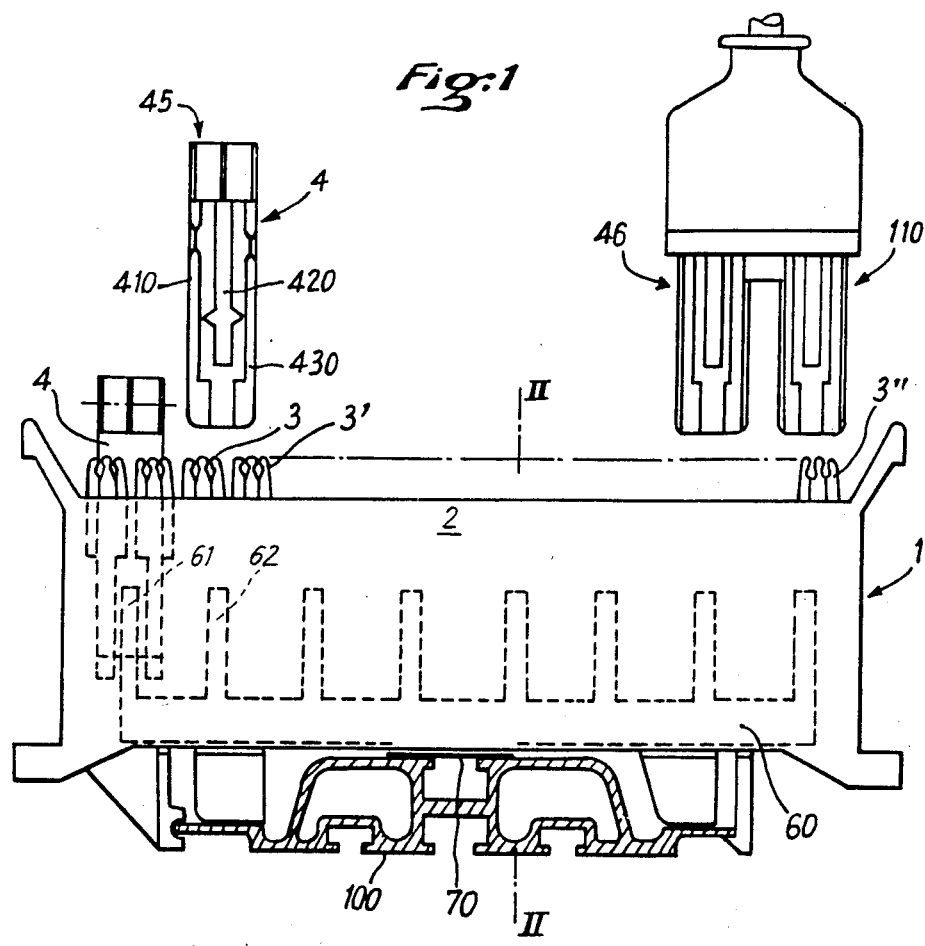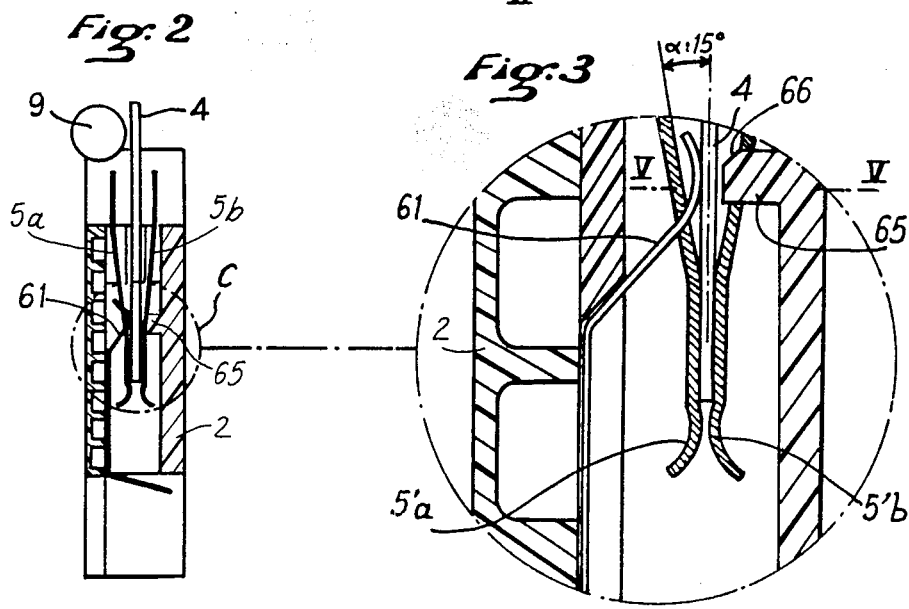

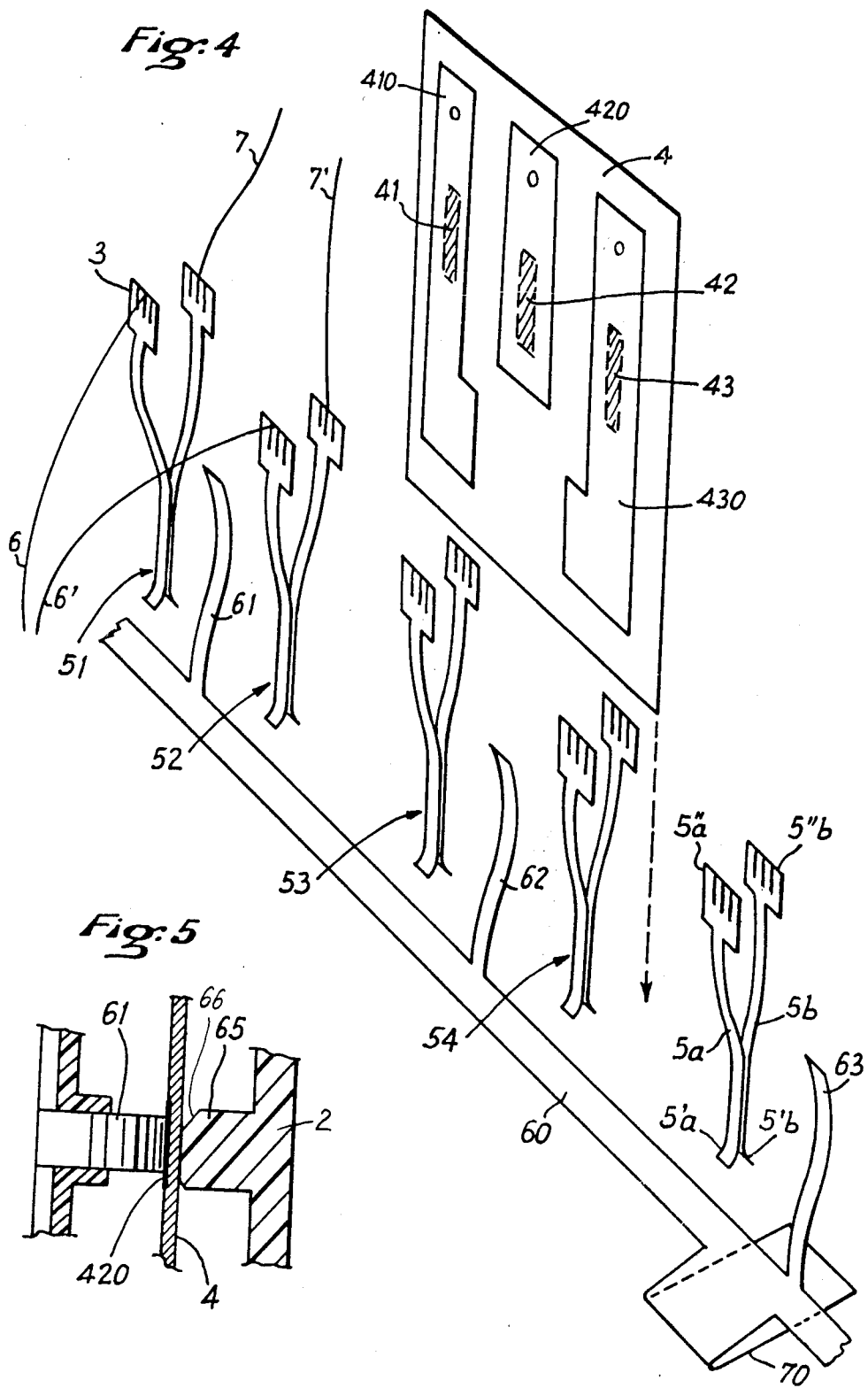

MODULAR CONTACT SYSTEM FOR TELEPHONE CABLE HEAD

BACKGROUND OF THE INVENTION

The present invention relates to modular contact systems such as those use in cable heads for telephone distributor frames, and in particular, to a protection and monitoring device for protecting such systems against external voltage surges, e.g.: lightning, inducted signals from railway lines, line-conveyed disturbances, electromagnetic impulses (e.g. nuclear explosions), etc.

A cable head, which is a typical example of a modular system and which is used below as a specific example of such a modular system, provides both test and protection functions. Such a modular contact system comprises a series of contacts each constituted by two blades of flexible metal pressing resiliently against each other. The connection may be opened by sliding a thin flat insulator element between the contacting blades, and various test, measurement, or protection circuits may be inserted in series by inserting a thin flat element having two independent contact surfaces for making contact with the blades. In particular, lightning protectors may be inserted in series. Cable heads and other systems such as connection strips are designed to receive particular corresponding lightning protectors, fuses, or other protection components (such as varistors). The housing which receives the components is designed as a function of the components it is to receive. The components selected thus determine the configuration of a particular housing. In particular, if a lightning protector is to be changed, for example to switch over from two-pole protection to three-pole protection, then the housing needs changing as well, and that is expensive.

With three-pole protection, any surge voltage between one of the phases or conductors of a component and ground or the other phase causes a short circuit to be established both to ground and between the phases.

The phenomena involved in providing such protection are not well understood because they are rapid, destructive, and difficult to reproduce in the laboratory under realistic conditions. If the contact system was designed as a transformable or adaptable support, various experiments could be performed without having to change the system or use a different one.

SUMMARY OF THE INVENTION

This invention thus provides a versatile modular contact arrangement for facilitating the connection of various protective and/or monitoring devices to phase lines of a cable head in a telephone distributor frame. The cable head includes a plurality of spaced, springy contact blade pairs, themselves arranged in associated pairs, with a common ground bar having individual springy fingers or blades interleaved between each associated pair in a comb-like manner. A circuit card having three parallel conductive strips printed on at least one face is configured to be insertable between two associated pairs of contact blades in a tongue-like manner such that electrical connections are established with such blades and with an interposed ground blade. Various circuit devices may be mounted on or connected to the card.

BRIEF DESCRIPTION OF THE DRAWINGS

An embodiment of the invention is described by way of example with reference to the accompanying drawings, in which:

FIG. 1 is an elevation view of a cable head having a ground conductor in accordance with the invention, the cable head being shown in dashed lines and being snap-fastened to a free-standing support rail;

FIG. 2 is a section on line II—II of FIG. 1;

FIG. 3 is a view on a larger scale of the portion of FIG. 2 shown within a circle C;

FIG. 4 is a perspective view on a larger scale showing the conductor elements of a portion of the cable head, together with a portion of a component support tongue; and FIG. 5 is a section on line V—V of FIG. 3.

DETAILED DESCRIPTION OF THE PREFERRED EMBODIMENTS

The cable head 1 shown in FIG. 1 comprises a plastic housing 2 in which contacts 3, 3', 3", etc. are housed. Each contact (see FIGS. 2 and 4) is constituted by two flexible blades 5a, 5b, which press resiliently against each other at one end 5'a, 5'b which is preferably located inside the housing 2, and whose other ends 5"a, 5"b are held apart from each other and located outside the housing. By inserting a tongue 4 between the blades 5a and 5b in a conventional manner, the circuit may be opened and various tests and measurements, etc. may be performed. The ends 5"a and 5"b are shaped in any suitable manner for connection to conductors, for example the blades 5a receive conductors 6, 6' from one end of a cable, and the blades 5b receive conductors 7, 7' from a jumper. The ends 5"a and 5"b may, for example, be wire-stripping slit contacts.

In general, two pairs of blades 5a and 5b constitute a single contact 51, 52, 53, etc., and the two phases or conductors 6, 6' of each cable circuit are connected to two adjacent contacts 51, 52.

The structure described above is conventional. Tongues of various configurations, as illustrated in FIG. 1, may be inserted between the blades 5a, 5b of the contacts 51, 52, etc. in order to perform measurements, provide protection, etc.

In accordance with the present invention, the housing further includes ground contacts 61, 62, 63 . . . which may advantageously be fixed to a ground bar 60. These contacts and the associated bar constitute a kind of comb. Each ground contact is disposed between the two associated contacts of a cable head circuit, and each pair of such circuit contacts together with the interposed ground contact are associated with a tongue 4 adapted to slide between the blades 5a and 5b and against the ground blade or contact 61 so that when the tongue is inserted three zones 41, 42, and 43 on one face of the tongue come into contact with a blade 5a, a ground contact (ex., 62 in FIG. 4), and the other blade 5a of the same circuit.

The tongue advantageously bears three metallized strips 410, 420, and 430 which extend substantially from one end to the other of the tongue in the insertion direction, with the strips bearing the zones 41, 42, and 43 respectively.

In order to be able to define the elastic contact force with the ground blade or contact 61, the corresponding blade presses against an abutment 65 when a tongue 4 is not inserted. Said abutment 65 is placed opposite the blade in such a manner as to limit its deflection, regardless of the resilient force the blade may exert. The insertion of a tongue 4 is facilitated by the presence of a chamfer 66 on the top edge of the abutment (see FIGS. 3 and 5). When the tongue 4 is absent, the blade 61 is pressed resiliently against the abutment 65. The tongue may be inserted without difficulty, regardless of the force with which the blade 61 presses against the tongue.

Preferably, the outside ends of 5″a and 5″b of the contact blades project from one side of the cable head and the ground bar 60 is situated along the opposite side of the cable head, which side also carries fixing members, e.g. deformable snap fasteners for mounting to a free standing rail 100.

In accordance with a particularly advantageous feature of the invention, the ground bar 60 is provided with a contact member 70 which presses against the rail 100, thereby ensuring a ground connection whenever the cable head 1 is snap fastened to a rail 100. As shown in FIG. 4, the contact 70 may be constituted by means of a fold in the metal sheet from which the ground contact is cut out, and which extends outwardly below the cable head.

The outside end of the tongue 4 may be fitted with any desired component, for example lightning protection means 9 (see FIG. 2). Two-pole lightning protection means or a single three-pole means may be provided between the strips 410, 420, and 430. The tongue may be constituted by a portion of a card 110 (see FIG. 1) bearing a plurality of tongues, together with such components and connections as may be desired for test circuits, measuring circuits, etc. The card may bear fuses, varistors, and other protective components, including devices for providing protection against electromagnetic impulses. The assembly can be used for trying out and testing such components and to monitor circuit behavior inside the cable head. The presence of the ground bar 60 inside the housing and on the opposite side from the side providing insertion access leaves more room on the access side, thereby facilitating connections.

Thus, it is possible to install very sophisticated and/or elaborate protective devices onto a cable head which is very cheap and without using special tooling. The components may be placed on one side of a card 4 or on both sides of the card. They may be embedded or they may be covered by a housing.

The tongue may have metallized strips on both faces (only one face shown), which strips may be identical. The strips on the two faces may be strapped together in facing pairs. In this manner, the tongues may be inserted either way round without difficulty. In accordance with another advantageous feature of the invention, the metallized strips may be electrically interconnected between faces by means of respective fuses. In this case, inserting a tongue between the contacts has the effect of providing a series-connected fuse.

The protection provided lies outside the cable head. The tongue or the card on which the protective circuit is printed is a poor conductor. In the event of a surge, e.g. raising a lightning protector to cherry red (1000° C.), the cable head is not destroyed since heat is not conducted, whereas in other systems the electrical connections are made by means of relatively good heat conductors. This makes it possible to omit internal short-circuiting devices which are very expensive and which are not very reliable for lightning protection, or alternatively to omit external short-circuiting devices which are expensive.

In accordance with a feature of the invention, the tongue is made of noncombustible material, for example a glass epoxy composite. This feature is most advantageous since it avoids equipment being destroyed and flame being propagated during heating.

Since the support is cheap, the module may be discarded after a destructive experiment, thereby enabling repetitive tests to be performed on installed equipment.

The housing 2 should be integrally molded with suitable shoulders and partitions for maintaining the ground bar 60 in position and for holding it, as shown in FIG. 3. If it is decided not to use the ground bar and its tongues, then the housing may be used in a conventional manner.

Advantageously, the shape and resilience of the blades 5a, and 5b are chosen so as to ensure that the circuits between the blades 5a and 5b are not opened, even briefly, when a tongue 4 is inserted or withdrawn.

In other words, the tongue cooperates with the blades during insertion or withdrawal in a "make before break" mode.

Thus, in order to change a lightning protector, the tongue is withdrawn without open-circuiting the line, and another tongue is inserted with a working protector. The ability to avoid open circuiting the line is becoming more and more important, in particular because of increasing data transmission over telephone channels.

Advantageously, the angle of incidence of the internal contact blades with the plane of the tongue is very small, about 15° (see FIG. 3), thereby making it easier to avoid opening the line circuit, and also reducing wear and tear during frequent insertion and withdrawal operations.

The tongues may be provided singly for a single pair of contacts as represented by the tongue 45 (FIG. 1, left side), or else in groups, for example in groups of two as represented by the set 46 (FIG. 2, right side), or else in a comb for entire cable head.

Finally, it may be observed that the interposing of ground bar 60 and insulator tongues 4 with printed circuits thereon between series of contact blades has the effect of providing a noise shield which improves resistance to cross-talk in transmission.

I claim:

1. A modular contact arrangement to enable the connection of selected protective and/or monitoring devices to desired phase lines (6,6′,7,7′) at a cable head in a telephone distributor frame, comprising:
   (a) a plurality of adjacent pairs (51, 52; 53, 54) of elongate phase line contactors (3,3′,3″) disposed in parallel and in a row,
   (b) each contactor comprising two flexible metal blades (5a,5b) resiliently self-biased towards each other at their one ends and defining a V-shaped mouth at their other, opposite ends,
   (c) a plurality of resilient, elongate, ground contact blades (61,62,63) individually disposed between each pair of contactors and aligned therewith in a generally planar manner,
   (d) a planar card (4) of non-conductive material insertable in a tongue-like manner into the mouths of a selected pair of contactors, and
   (e) three parallel strips of conductive material (410,420,430) disposed on at least one face of the card and laterally spaced apart to correspond to spacings between a pair of contactors (53, 54) and an interposed ground contact blade (62) such that said strips establish electrical contact with two contactor blades and a ground contact blade upon the insertion of the card, said strips extending outwardly from said mouths and being connectable to protective and/or monitoring devices.

2. An arrangement according to claim 1, wherein the ground contact blades are fixed to a ground bar (60) to form a comb-shaped assembly.

3. An arrangement according to claim 2, wherein said opposite ends of the contactor blades have phase line connection slits all pointing in the same direction, and wherein the ground bar is disposed proximate said one ends of the contactor blades.

4. An arrangement according to claim 3, wherein the contactors are mounted in a housing (2) which is snap-fittable on a support rail (100), and wherein the ground bar is provided with a contact element (70) engaging said support rail when said housing is snap fitted thereto.

5. An arrangement to claim 4, wherein said card is made of noncombustible material, for example a glass-epoxy composite.

6. An arrangement according to claim 4, wherein said card is provided with three additional strips of conductive material on another, opposite face superposed over said three parallel strips, and wherein said strips are electrically connected in facing pairs.

* * * * *